Sept. 30, 1947.  G. JONES  2,428,226
DRAFT HITCH FOR VEHICLES
Filed March 13, 1946
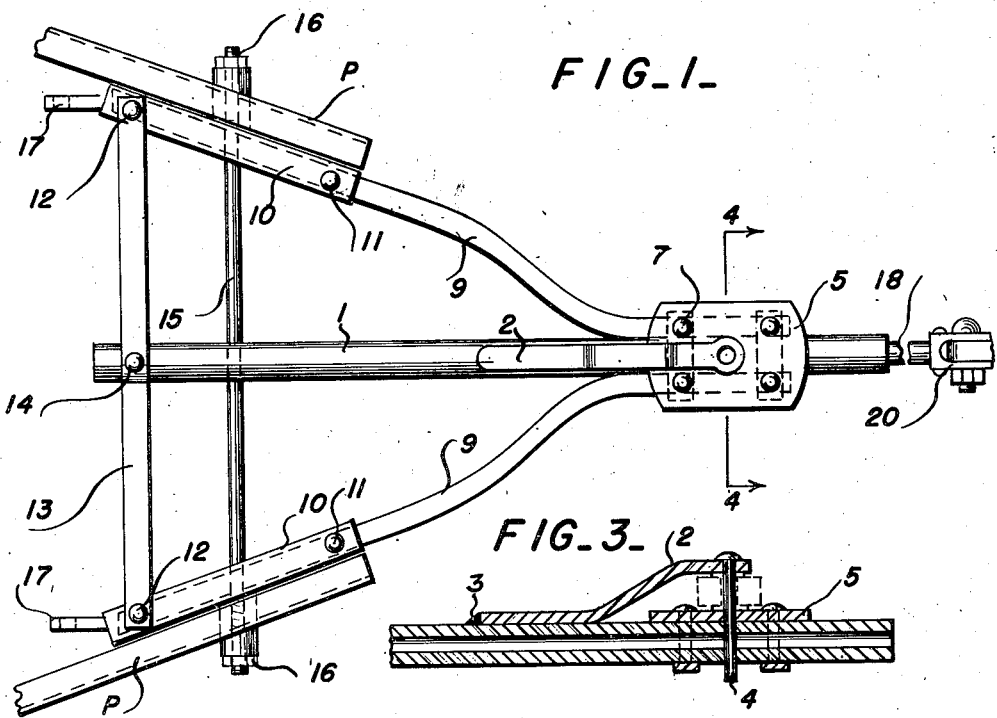
INVENTOR.
GOULD JONES
BY *Victor J. Evans & Co.*
ATTORNEYS Patented Sept. 30, 1947

2,428,226

UNITED STATES PATENT OFFICE 2,428,226

DRAFT HITCH FOR VEHICLES

Gould Jones, Jasper, Ark.

Application March 13, 1946, Serial No. 653,986

2 Claims. (Cl. 280—33.44)

The present invention relates to an improved draft hitch for vehicles of the type that may readily be interchanged and adapted for use as a draft appliance for horse-drawn vehicles, as well as for use with power propelled vehicles, as tractors, usually employed to haul farm machinery or implements.

The primary object of the invention is the provision of a draft attachment or coupling that is also adapted for use as a hitch for horse drawn vehicles, which is characterized by simplicity in construction; in which a minimum number of standardized parts may be manufactured at comparative low cost of production; and in which the parts may with convenience be assembled, and adjusted, with a minimum expenditure of labor.

When employed with horse-drawn equipment the draft appliance may with facility be pivoted or hinged by thill couplings to the front axle of a vehicle, or the draft appliance may be utilized to couple a tractor with other types of vehicles, machinery, or implements.

Means are employed whereby the length of the draft appliance may be adjusted for different uses, and the appliance is automatically adjustable in a vertical plane to reduce strains on draft-horses, as well as to compensate for irregularities in the ground traversed and to absorb angular stresses encountered by the draft appliance.

The invention consists in certain novel combinations and arrangements in the draft appliance involving a central longitudinally extending, telescopic draft tongue or draft pole, a coupling head, front and rear connections for the appliance, and other component parts as will hereinafter be more fully set forth. In the accompanying drawings I have illustrated one complete example of the convertible draft appliance, or hitch, in which the parts are combined and arranged according to one mode I have devised for the practical application of the principles of my invention, but it will be understood that changes and alterations may be made in these exemplifying drawings, within the scope of my appended claims without departing from the principles of the invention.

Figure 1 is a top plan view of the draft appliance adapted for use between a tractor and a vehicle.

Figure 2 is an edge view of the draft appliance or hitch.

Figure 3 is a longitudinal, sectional view through the socket-tongue and the coupling head of the appliance.

Figure 4 is a transverse, vertical, sectional view through the coupling head and socket-tongue.

Figure 5 is a plan view of a draw-bar, detached adapted for telescopic adjustment within the socket tongue.

Figure 6 is a plan view of the draw-bar detached from Fig. 1.

In the form of the invention illustrated in the assembly view, Fig. 1, the draft appliance is pivotally combined or hinged to laterally spaced pole-jaws P, P, of a vehicle; and the appliance is also equipped with alternate means forming thill couplings for pivotally connecting the appliance to the front axle of a vehicle.

In carrying out my invention I employ a central, longitudinally extending tubular member or socket-tongue 1, which may be fashioned from a standard pipe section, and upon which is mounted a metallic keeper-strap or brace 2 preferably welded at 3 to the upper exterior face of the socket-tongue, leaving the interior bore of the socket-tongue free of obstructions.

A coupling pin or bolt 4 is mounted in the strap, and this bolt may secure a double-tree T shown in dotted lines in Fig. 3, or other component parts of a horse-drawn hitch may be secured by the pin.

The tubular tongue forms a socket for the reception of various forms of telescopic draft poles, or extension draft-bars, and these selected parts are coupled by the pin in combination with a draft-head which includes an upper horizontal plate 5 and lower longitudinally spaced, transverse straps 6, 6, that are fastened together as by bolts 7 and nuts 8. The keeper-strap 2, the plate 5 and the socket-tongue are provided with registering holes for the reception of the coupling pin or bolt, as best seen in Figure 4.

For laterally bracing and stabilizing the socket-tongue and coupling head, a pair of rearwardly extending and diverging side bars or hounds 9, 9, are mounted at the sides of the socket-tongue, with their front ends clamped within the coupling head. These hounds may also be fashioned from suitable pipe sections, and bent to their desired form or shape, and their rear ends are equipped with angle-iron end plates 10, 10, that are closely fitted over the cylindrical hounds and fastened thereto by bolts or rivets 11, 11, and 12, 12. The rear ends of the hounds are rigidly connected by two complementary transverse straps 13, that form a tie-bar fastened at its ends to the hounds by bolts or rivets 12, 12, and this tie-bar is also fastened to the rear end of the socket-tongue 1 by a bolt 14 passing through the two straps and the socket-tongue.

The draft gearing or draft appliance thus described is shown in Fig. 1, as pivoted upon the spaced supporting pole-jaws P, P, by means of a cross bar 15 which passes through an opening in the socket-tongue to form a pivot-bearing. Other bearings for the pivoted appliance are provided at opposite ends of the pivot bar, which ends are passed through bearing holes in the hounds, and through the supports P, P, of a vehicle. The parts are retained against displacement by means of retaining nuts 16 on the protruding threaded ends of the pivot bar, and it will be apparent that the appliance may swing in a vertical plane on the bar as a pivot or hinged support.

A pivot support for alternate use of the draft gear may be provided by the use of eye-bolts or hinge members 17, 17, rigidly mounted at the rear ends of the hounds, and these members are adapted to co-operate with other members of a thill coupling on a vehicle, not shown.

Various forms of longitudinally adjustable and interchangeable draft-bars, or draft-poles, may be employed with the socket-tongue 1, as indicated in Figs. 1, 2, 5, and 6, and by telescopic adjustment of the draw-bars in the socket-tongue the overall length of the pole-member may be increased or diminished.

In Figs. 1, 2, and 6, the draft bar 18, which may be fashioned from standard pipe sizes adapted to telescope in the socket-tongue, is provided with a series of longitudinally spaced holes 19 to accommodate the coupling pin 4, and this draw bar is provided at its front end with a clevis 20, or other suitable device, for connection with a tractor, or other towing appliance or implement.

In Fig. 5, another, and longer, draw bar 21 is illustrated having selective holes 19 for the coupling pin 4, and this draw-bar is equipped with a neck yoke toggle 22 at its front end for use with the hitch when horse power is utilized.

From the above description, taken in connection with the drawings, it will be apparent that I have devised a novel and useful draft appliance embodying the features and advantages heretobefore enumerated; and while I have in the present instance shown and described a preferred arrangement of parts giving satisfactory and reliable results, it will be understood that parts may be interchanged and adjusted to meet varying conditions in use of the draft gear without departing from the principles of my invention.

Having thus fully described my invention, what I claim as new and desire to secure by Letters Patent is:

1. A draft appliance comprising a tubular socket tongue, a strap secured to the tongue and extending longitudinally therealong and having an end removed from the side of the tubular tongue, a plate disposed on the tongue between the tongue and the removed end of the strap and adapted to receive a double-tree, a removable pin extending through the removed end of the strap, the plate and the tubular tongue and adapted to attach a double-tree to the appliance, a draft bar telescopically connected to the tubular socket tongue, said draft bar having holes therein, said pin upon extending through the tongue and the double-tree also extending through the draft bar to hold the same against displacement within the tubular tongue, and means for pivotally connecting the tongue to the pole jaws of a vehicle.

2. A draft appliance as defined in claim 1, and said means for pivotally connecting the tubular member to the pole jaws of a vehicle comprising rearwardly diverging hounds disposed upon opposite sides of the tubular member, the forward ends of said hounds being connected to said plate on which the double tree may be mounted, a pivot pin adapted to extend through the tubular member and the rear end of the hounds and into the pole jaws of the vehicle.

GOULD JONES.

REFERENCES CITED

The following references are of record in the file of this patent:

UNITED STATES PATENTS

| Number | Name | Date |
|---|---|---|
| 770,746 | Fletcher | Sept. 27, 1904 |
| 1,068,334 | Goodhue | July 22, 1913 |
| 529,734 | Henderson | Nov. 27, 1894 |